(12) United States Patent  
Hintennach et al.

(10) Patent No.: US 12,208,664 B2
(45) Date of Patent: Jan. 28, 2025

(54) PROTECTION DEVICE FOR A MOTOR VEHICLE INTERIOR

(71) Applicant: BOS GmbH & Co. KG, Ostfildern (DE)

(72) Inventors: Markus Hintennach, Uhingen (DE); Carolin Günther, Reutlingen (DE); Philip-Daniel Maier, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 340 days.

(21) Appl. No.: 17/713,735

(22) Filed: Apr. 5, 2022

(65) Prior Publication Data

US 2022/0324302 A1 Oct. 13, 2022

(30) Foreign Application Priority Data

Apr. 8, 2021 (DE) .......................... 102021203478.0

(51) Int. Cl.
*B60J 7/00* (2006.01)
*B60J 3/02* (2006.01)

(52) U.S. Cl.
CPC .............. *B60J 3/02* (2013.01); *B60J 7/0015* (2013.01)

(58) Field of Classification Search
CPC . B60J 3/02; B60J 7/0015; B60J 1/2013; B60J 1/2041; B60J 1/2052; B60J 1/2075; B60J 1/2077; B60J 1/208; B60J 1/2083
See application file for complete search history.

(56) References Cited

U.S. PATENT DOCUMENTS 1,815,551 A * 7/1931 Dunn ...................... E06B 9/581
160/279
3,033,970 A 5/1962 Eisler
(Continued)

FOREIGN PATENT DOCUMENTS

CN 107539240 A 1/2018
CN 110027473 A 7/2019
(Continued)

OTHER PUBLICATIONS

German Office Action issued in corresponding German Application No. 10 2021 203 478.0, date of mailing Nov. 11, 2021 (6 pages).

(Continued)

*Primary Examiner* — Johnnie A. Shablack
(74) *Attorney, Agent, or Firm* — FLYNN THIEL, P.C.

(57) ABSTRACT

Protection device for a motor vehicle interior having a flexible planar structure which, between a deployed protective position and a compact deposited resting position, is displaceable along an extraction direction so as to be guided by guide rails that lie opposite one another so as to be transverse to the extraction direction. At least one guide tape is disposed on a lateral peripheral region of the flexible planar structure and is at least indirectly connected to the flexible planar structure. The flexible planar structure via the guide tape, is held on one of the guide rails. A functional assembly is provided, which is elastically elongatable at least in the transverse direction and via which the flexible planar structure and the guide tape are mechanically connected to one another in an electrically conductive manner. The electrical connection is for supplying power to an electrical consumer.

17 Claims, 8 Drawing Sheets

(56) References Cited

U.S. PATENT DOCUMENTS

| | | | | |
|---|---|---|---|---|
| 3,116,097 | A * | 12/1963 | Novales | E06B 9/581 |
| | | | | 312/297 |
| 7,950,440 | B2 * | 5/2011 | Rockelmann | B60J 1/2052 |
| | | | | 160/370.22 |
| 8,689,853 | B2 * | 4/2014 | Clephas | B60J 7/0015 |
| | | | | 160/370.22 |
| 8,690,234 | B2 * | 4/2014 | Rockelmann | B60J 7/0015 |
| | | | | 296/214 |
| 8,757,241 | B2 * | 6/2014 | Stark | B60J 1/2041 |
| | | | | 160/370.22 |
| 8,827,347 | B2 * | 9/2014 | Snider | B60J 7/0015 |
| | | | | 160/370.22 |
| 9,539,883 | B2 * | 1/2017 | Snider | B60J 1/2019 |
| 9,815,354 | B2 * | 11/2017 | Haumann | B60Q 3/64 |
| 9,840,134 | B2 * | 12/2017 | Van Boxtel | B60J 7/0015 |
| 10,081,233 | B2 | 9/2018 | Katsuramaki | |
| 10,132,117 | B2 * | 11/2018 | Munsters | E06B 9/42 |
| 10,209,038 | B2 * | 2/2019 | Wallace | E06B 9/08 |
| 11,078,722 | B2 * | 8/2021 | Ammerlaan | E06B 9/262 |
| 11,226,089 | B1 * | 1/2022 | McRae | F21V 23/0435 |
| 11,248,416 | B2 * | 2/2022 | Klish | A62C 2/10 |
| 11,453,333 | B2 | 9/2022 | Winton et al. | |
| 11,828,964 | B2 * | 11/2023 | Takahashi | G02B 5/3016 |
| 12,024,001 | B2 * | 7/2024 | Jansen | B60J 1/2041 |
| 2006/0027347 | A1 * | 2/2006 | Boehm | B60J 7/0015 |
| | | | | 160/273.1 |
| 2008/0197655 | A1 * | 8/2008 | Oerke | B60J 7/0015 |
| | | | | 296/83 |
| 2009/0145559 | A1 * | 6/2009 | Glasl | B60J 1/2041 |
| | | | | 160/273.1 |
| 2009/0178771 | A1 * | 7/2009 | Lin | B60J 7/0015 |
| | | | | 160/370.22 |
| 2022/0324302 | A1 * | 10/2022 | Hintennach | B60J 7/0015 |
| 2023/0167642 | A1 * | 6/2023 | Heil | E06B 9/581 |
| | | | | 160/66 |

FOREIGN PATENT DOCUMENTS

| | | |
|---|---|---|
| DE | 102005030973 A1 | 1/2007 |
| DE | 202014103268 U1 | 8/2014 |
| DE | 102019209519 A1 * | 2/2020 |
| DE | 102019212371 A1 | 2/2021 |
| EP | 0815898 A2 | 1/1998 |
| WO | 2009135487 A2 | 11/2009 |
| WO | 2015108427 A1 | 7/2015 |

OTHER PUBLICATIONS

Chinese Office Action issued in corresponding Chinese Application No. 202210366848.0 dated Apr. 29, 2024 (7 pages).

Chinese Office Action issued in corresponding Chinese Application No. 202210366848.0 dated Oct. 25, 2024 (8 pages).

* cited by examiner

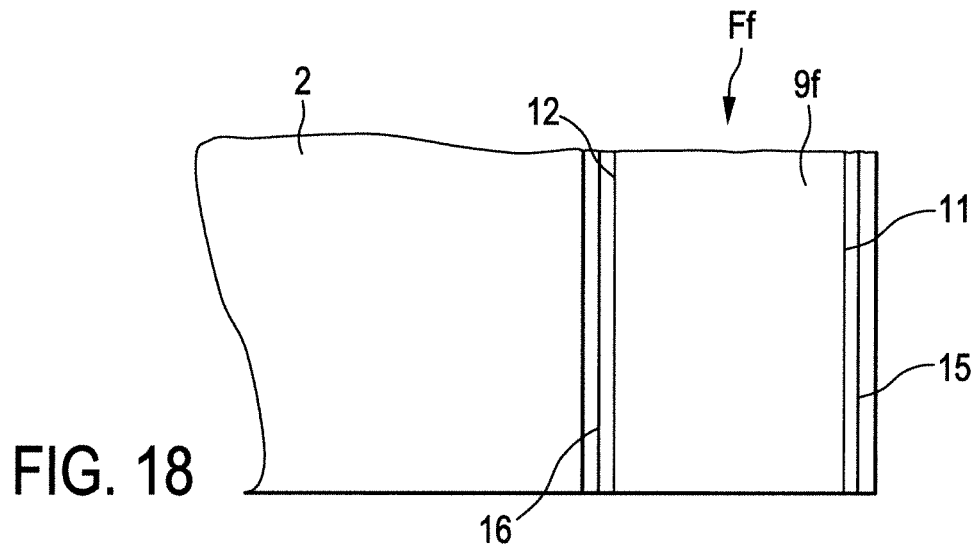
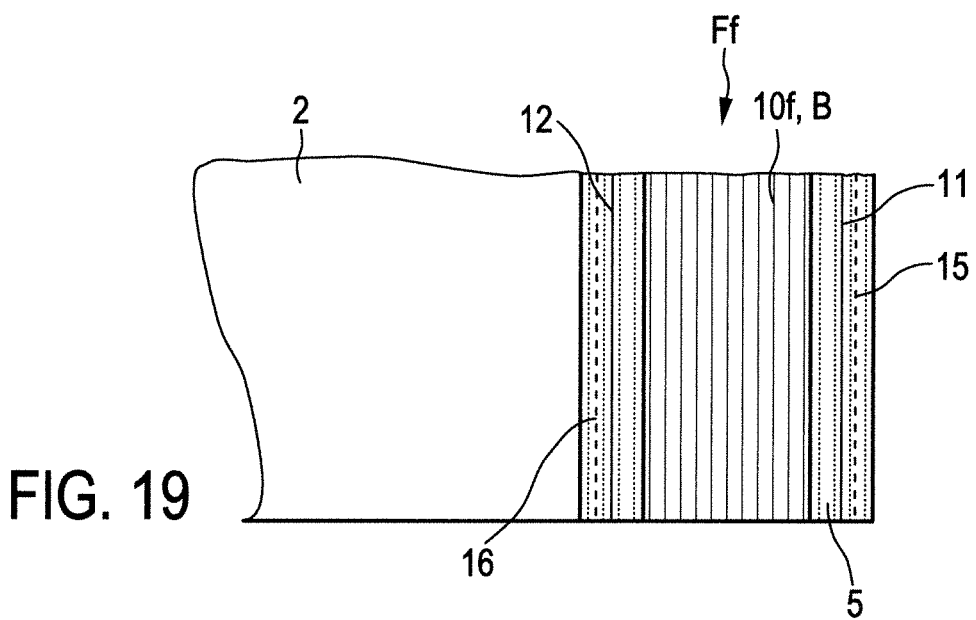
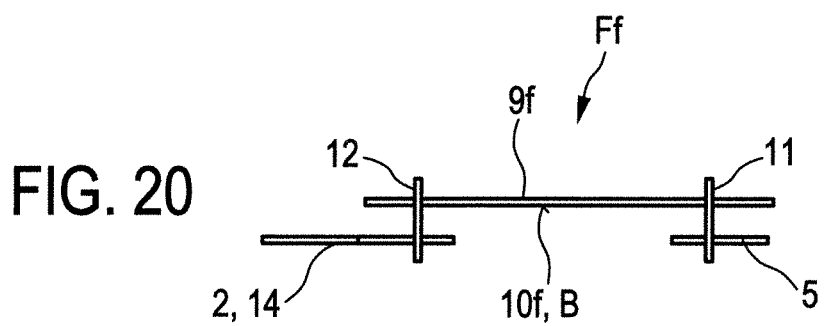

PROTECTION DEVICE FOR A MOTOR VEHICLE INTERIOR

CROSS REFERENCE TO RELATED APPLICATION

This claims priority from German Application No. 10 2021 203 478.0, filed Apr. 8, 2021, the disclosure of which is hereby incorporated by reference in its entirety.

TECHNICAL FIELD

The invention relates to a protection device for a motor vehicle interior, having a flexible planar structure which, between a deployed protective position and a compact deposited resting position, is displaceable along an extraction direction so as to be guided on opposite guide rails that are spaced from one another in a direction transverse to the extraction direction, at least one guide tape which is disposed in a lateral peripheral region of the flexible planar structure and is at least indirectly connected to the flexible planar structure, the flexible planar structure by means of the at least one guide tape, in a transverse direction that is oriented so as to be transverse to the extraction direction, being held on at least one of the guide rails.

BACKGROUND AND SUMMARY

A protection device of this type is known from DE 10 2005 030 973 A1 and in the form of a roller blind assembly provided for shading a window opening of a motor vehicle. The known roller blind assembly has a blind web as a flexible planar structure. The blind web is displaceable along an extraction direction so as to be guided between two guides that are fixed to the vehicle. The blind web on the opposite peripheral regions thereof, which peripheral regions are spaced from one another in a direction transverse to the extraction direction, is in each case held on the respective guide by a tape-shaped guide element.

It is an object of the invention to provide a protection device of the type mentioned at the outset which has an enhanced scope of functions and at the same time is of a simple and robust construction.

This object is achieved in that a functional assembly which is elastically elongatable at least in the transverse direction and by means of which the flexible planar structure and the guide tape are mechanically connected to one another in an electrically conductive manner is present, the electrical connection being configured for supplying power to an electrical consumer assigned to the flexible planar structure. As a result of the solution according to the invention, a connection between the flexible planar structure and the guide tape that is elastically elongatable least in the transverse direction is achieved, on the one hand. As a result thereof, a transverse spacing between the mutually opposite guide rails that is variable over the extraction direction can be compensated for, as a result of which any undesirable creasing of the flexible planar structure in the deployed protective position of the latter is counteracted. Said variable transverse spacing may be caused by production tolerances or by an intentional non-parallel longitudinal extent of the guide rails. On the other hand, an electrical connection between the guide tape and the flexible planar structure, more specifically the electrical consumer of the flexible planar structure, is simultaneously achieved by the solution according to the invention. The electrical consumer can be disposed on the flexible planar structure, or be incorporated into the flexible planar structure, so to speak. The electrical consumer is preferably in each case an electrically operated display installation, a heating installation and/or a loudspeaker installation. The functional assembly present according to the invention is thus particularly advantageously imparted multiple functions. This is because the mechanical connection between the flexible planar structure and the guide tape is achieved by means of the functional assembly, on the one hand. On the other hand, the electrical connection between the guide tape and the flexible planar structure and/or the assigned electrical consumer is simultaneously achieved by means of the functional assembly. As a result of the elastic elongation capability of the functional assembly that is present at least in the transverse direction, it is additionally ensured that the electrical connection is maintained even in the case of a transverse spacing between the guide rails that is variable over the extraction direction. As a result thereof, a simple and robust construction can be achieved or at least maintained despite the enhanced scope of functions of the protection device. The functional assembly preferably comprises load-bearing mechanical connecting parts, portions, components and/or structures as well as current-conducting electrical connecting parts, portions, components and/or structures that are connected to one another while configuring the functional assembly. This connection can be configured so as to be form-fitting, force-fitting and/or materially integral. Alternatively or additionally, the functional assembly preferably comprises parts, portions, components and/or structures which serve the mechanical as well as the electrical connection and to this extent are mechanically load-bearing as well as electrically current-conducting. The mechanical connection between the functional assembly and the peripheral region of the flexible planar structure, on the one hand, and the guide tape, on the other hand, can in each case be configured so as to be form-fitting, force-fitting and/or materially integral. The same applies in an analogous manner to the respective electrical connection between the functional assembly and the peripheral region of the flexible planar structure and/or the guide tape. The functional assembly is preferably also elastically elongatable along the extraction direction. This facilitates in particular that the electrical connection is reliably maintained also in the deployed protective position of the flexible planar structure. The functional assembly is preferably designed so as to be tape-shaped and, preferably continuously, elongate parallel to the extraction direction and/or a direction of the longitudinal extent of the at least one guide rail. The guide tape is preferably electrically conductive. In this case, the electrically conductive guide tape serves simultaneously for energizing the functional assembly, on the one hand, and for mechanically guiding the flexible planar structure on the at least one guide rail, on the other hand. The flexible planar structure is preferably held so as to be able to be wound and unwound on a rotatably mounted winding shaft. The functional assembly here is preferably able to be wound onto the winding shaft and unwound from the latter conjointly with the flexible planar structure.

The solution according to the invention is particularly advantageously suitable for a protection device in the form of a shading device of a motor vehicle interior. To this extent, the protection device can be configured as a shading device, in particular for a side window, a rear window or a roof window of the motor vehicle. Alternatively, the protection device can be a separating and/or covering device for a loading space in the interior of the motor vehicle, and function as a separating net or a loading space cover, for example.

In one embodiment of the invention, the functional assembly is elongate continuously across an overall length of the peripheral region of the flexible planar structure and/or the guide tape. As a result thereof, a mechanical and electrical connection is achieved not only in regions and/or portions. Instead, the elongate configuration of the functional assembly guarantees a continuous and thus ideally complete mechanical and electrical connection across the overall length of the peripheral region, or of the guide tape, respectively. The inventors have recognized that this embodiment of the invention is particularly robust in relation to damage and external influences, so that a particularly reliable protection device can be achieved.

In a further embodiment of the invention, the functional assembly has a conduction device for the electrical connection, and a connection device for the mechanical connection, the latter being connected to the conduction device, the conduction device being elastically elongatable conjointly with the connection device and vice versa. This embodiment of the invention provides a type of functional separation of individual parts, portions, components and/or structures of the functional assembly in terms of a mechanical, load-bearing function, on the one hand, and an electrical, current-conducting function, on the other hand. The connection device is provided for the former. The conduction device is provided for the latter. As a result thereof, the material, the design and/or the production of the respective device can be adapted to the corresponding function. This offers particular advantages. The conduction device and the connection device are preferably connected to one another in a form-fitting, force-fitting and/or materially integral manner. The conduction device as well as the connection device are elastically elongatable at least in the transverse direction so that both devices are conjointly elastically elongatable in the mutually connected, operationally ready state.

In a further embodiment of the invention, the connection device is a textile connection tape which is elastically elongatable at least in the transverse direction. This enables in particular a construction which is particularly simple and cost-effective. The textile connection tape can be a narrow fabric or a tape-shaped fabric portion. The textile connection tape can in particular be configured as a warp/weft-knitted fabric, a woven fabric, and/or a flat or circular knitted fabric. The conduction device is preferably applied to the textile connection tape and/or incorporated in the latter. In this embodiment of the invention, the conduction device can be applied to the textile connection tape as a coating, for example, or in the form of a thread assembly be connected to the textile connection tape, in particular by sewing, weaving, warp/weft-knitting, flat or circular knitting and/or felting. The conduction device is preferably formed from an insulated or tin-plated copper material. The textile connection tape in the transverse direction is preferably sewn, adhesively bonded and/or welded to the flexible planar structure at one end. Accordingly, this preferably applies in an analogous manner to a connection to the guide tape configured at the other end. Furthermore preferably, the textile connection tape is additionally elastically elongatable along the extraction direction. The textile connection tape is preferably made from polyester and/or silicone, the latter preferably being wrap-spun with PES. The textile connection tape furthermore preferably has a first thread system and a second thread system which are preferably designed as a warp and a weft, respectively. Furthermore preferably, the warp is formed from, preferably textured, polyester and the weft is formed from, preferably textured, silicone. The aforementioned materials and combinations of materials may also be used in the other embodiments of the invention.

In a further embodiment of the invention, the conduction device has an electrically conductive thread assembly which is elastically elongatable at least in the transverse direction and is connected in a form-fitting manner to the connection device, in particular by sewing, weaving, warp/weft-knitting, flat or circular knitting and/or felting. This is a particularly advantageous embodiment of the invention. The thread assembly is preferably formed from at least one yarn, doubled yarn, thread or the like. The thread assembly is preferably made from an electrically conductive material and/or composite material. The thread assembly preferably has a twisted yarn which is made from stainless steel and polyester and to this extent can also be referred to as a hybrid twisted yarn. Alternatively or additionally, the thread assembly preferably has a twisted yarn which is made from silver-coated polyamide and polyester and accordingly can likewise be referred to as a hybrid twisted yarn. Alternatively or additionally, the thread assembly preferably has a so-called multifilament which is made from silver-coated polyamide. The aforementioned materials and combinations of materials may also be used in other embodiments of the invention. Alternatively or additionally, the thread assembly can be provided with an electrically conductive coating. The thread assembly is in any case connected to the connection device. Additionally, the thread assembly can be connected, in particular sewn, to the flexible planar structure and/or the guide tape. The thread assembly is preferably formed from an elastically elongatable material. Alternatively or additionally, the thread assembly per se can have an elastically elongatable design. Thread assemblies or seam constructions, respectively, having an elastic elongation capability per se are known in the field of textile technology.

In a further embodiment of the invention, the thread assembly has a thread reserve which is formed from a plurality of thread loops oriented so as to be transverse, in particular orthogonal, and/or parallel to the extraction direction. The thread reserve formed from the plurality of thread loops causes and/or facilitates the elastic elongation capability of the thread assembly. Said thread loops are not connected to the peripheral region of the flexible planar structure and/or to the guide tape. In simple words, as a result of this absent connection a manner of slippage of the thread loops is enabled when the functional assembly is stressed transversely and/or longitudinally, this ultimately providing an elastic elongation capability of the thread assembly.

In a further embodiment of the invention, the thread assembly forms a textile conductor tape which is elastically elongatable at least in the transverse direction. In this embodiment of the invention, the threaded assembly is accordingly a woven fabric, a flat or circular knitted fabric or a warp/weft-knitted fabric formed from at least one twisted yarn, yarn, thread or the like. Accordingly, the textile conductor tape can in particular be woven, warp/weft-knitted, flat or circular knitted, or the like. This embodiment of the invention can in particular offer advantages in terms of production. This is because the conductor tape can be made separately from the connection device and thereafter be connected to the latter. This is in contrast to other embodiments of the invention in which a yarn, twisted yarn, thread or the like is connected in a form-fitting manner, in particular sewn, to the connection device while configuring the thread assembly and thus the conduction device.

In a further embodiment of the invention, the functional assembly is an electrically conductive, textile functional tape which is elastically elongatable at least in the transverse direction. As opposed to other embodiments of the invention which provide a type of functional separation between the mechanical connection, on the one hand, and the electrical connection, on the other hand, this embodiment of the invention provides an integration of both functions in one and the same component, specifically the textile functional tape. The textile functional tape serves for the mechanical connection, on the one hand, and simultaneously for the electrical connection, on the other hand. The textile functional tape is preferably made from an electrically conductive textile having an adequate mechanical load-bearing capability. The electrical conductivity can be achieved by a corresponding choice of material. For example, the textile functional tape can be at least in portions, preferably completely, made from a metallic twisted yarn, thread, yarn or the like. The elastically elongatable properties can be guaranteed by a corresponding textile construction, in particular a woven-fabric construction, a knitted-fabric construction or the like. Elastically elongatable textile constructions are known in principle in the field of textile technology.

In a further embodiment of the invention, the connection device is coated with an electrically conductive coating that forms the conduction device, the coating being in particular in printed on the conduction device. This embodiment of the invention offers advantages in particular when the connection device is configured as a textile connection tape which is elastically elongatable in the transverse direction. The coating is preferably imprinted on the conduction device by means of a printing method, for example plotting, transfer printing, sublimation printing or the like, which is suitable for this purpose. The coating is made from an electrically conductive, in particular metallic, material. Furthermore, preferably, this material is capable of printing by means of printing methods suitable to this end. This embodiment of the invention enables a particularly simple, cost-effective and robust construction of the protection device.

In a further embodiment of the invention, the functional assembly by means of at least one connection seam is at least in portions, preferably continuously, connected in a mechanical and/or electrically conductive, form-fitting manner to the guide tape and to the peripheral region of the flexible planar structure. As a result thereof, ease of production and manufacturing that is yet again simplified can in particular be achieved. A first connection seam for connecting to the guide tape and a second connection seam for connecting to the peripheral region of the flexible planar structure are preferably present. Alternatively or additionally, separate connection seams to the mechanical connection, on the one hand, and to the electrically conductive connection, on the other hand, may be present.

In a further embodiment of the invention, the electrical consumer is disposed on the flexible planar structure and, conjointly with the latter, is able to be deployed and deposited in a compact manner, and/or the flexible planar structure forms the electrical consumer, so to speak. In the latter case, the reference may also be made to a smart textile. The electrical consumer is preferably a display installation, a heating installation and/or a loudspeaker installation. The display installation is specified for displaying items of information in a manner that can be perceived by occupants of the motor vehicle. For example, the display installation can be a flexible display screen. The heating installation is specified for heating the motor vehicle interior and can be a flexible heating surface, for example. The loudspeaker installation is specified for filling the motor vehicle interior with sound for the purpose of broadcasting acoustic information and/or noise canceling.

BRIEF DESCRIPTION OF THE DRAWINGS

Further advantages and features of the invention are derived from the claims as well as from the description hereunder of preferred exemplary embodiments of the invention which are illustrated by means of the drawings in which:

FIGS. 18, 19, 20 show a further variant of the functional assembly.

DETAILED DESCRIPTION

Figure 1:
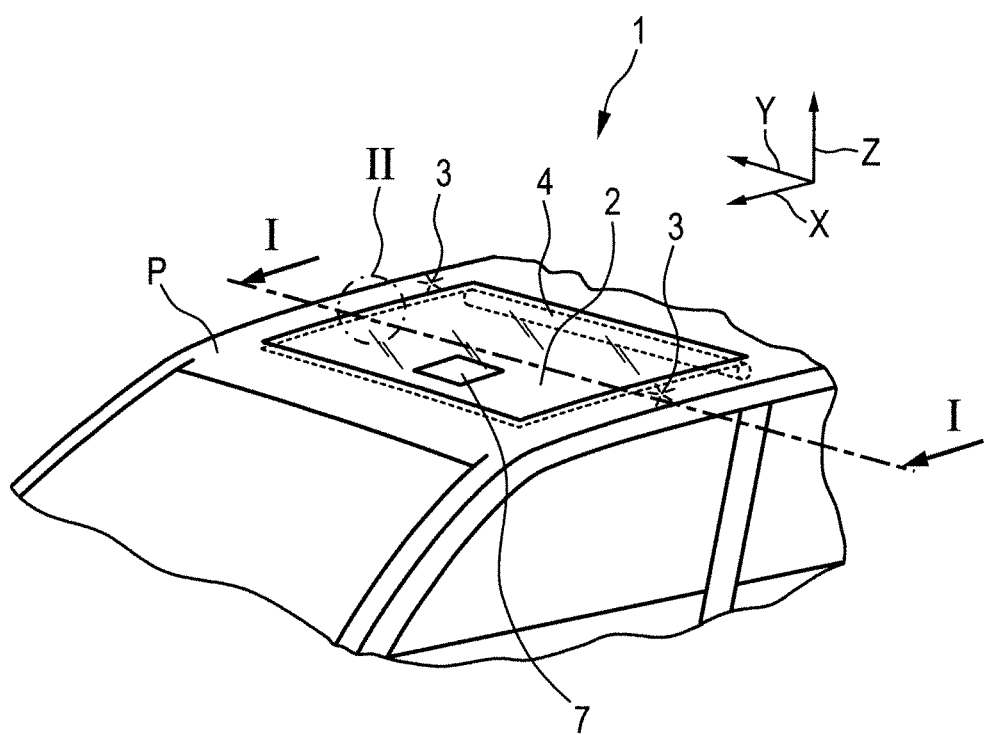
FIG. 1 is a schematic, highly simplified and partially cutaway illustration and shows a passenger motor vehicle which is provided with an embodiment of a protection device according to the invention in the form of a shading device.

Provided according to FIG. 1 is a protection device 1 in the form of a shading device for a motor vehicle interior of a motor vehicle P illustrated only in parts. The protection device 1 in the embodiment shown is provided for shading a window opening which is not described in more detail and is disposed on the roof on the motor vehicle P.

The protection device 1 has a flexible planar structure 2 which, between a deployed protective position and a compact deposited resting position, is displaceable along an extraction direction X so as to be guided by guide rails 3 that lie opposite one another and are spaced from one another in a direction transverse to the extraction direction X. In the protective position, the interior of the motor vehicle P is shaded by means of the flexible planar structure 2. In the compact deposited resting position, the flexible planar structure 2 leaves said window opening free.

In the embodiment shown, the extraction direction X is oriented so as to be parallel to a longitudinal axis of the motor vehicle P. The guide rails 3 in the assembled, operationally ready state are fixed to the motor vehicle so as to be disposed on opposite lateral regions of the roof opening and mutually spaced apart along a transverse direction Y. The transverse direction Y is oriented so as to be orthogonal to the extraction direction X and presently so as to be parallel to a transverse axis of the motor vehicle P. The guide rails 3 presently are elongate in a mutually parallel manner. In embodiments not illustrated in more detail in the drawings, the guide rails may also be elongate so as not to be mutually parallel.

The flexible planar structure 2 presently is held so as to be able to be wound onto a winding shaft 4 and unwound from the latter. The winding shaft 4 is rotatably mounted so as to be fixed to the motor vehicle, in a manner known to the person skilled in the art, and presently is disposed on a rear edge of the window opening not referred to in more detail. In the protective position, the flexible planar structure 2 is unwound from the winding shaft 4. In the resting position, the flexible planar structure 2 is wound onto the winding shaft 4. The winding shaft 4 is elongate so as to be parallel to the transverse direction Y. The displacement of the flexible planar structure 2 between the protective position and the resting position can be performed manually and/or in a motorized manner. For example, the flexible planar structure 2 on the front edge thereof that faces away from the winding shaft 4 can be provided with an extraction bow for manual handling. Alternatively or additionally, the protection device can have a drive unit which for the driven displacement interacts with the flexible planar structure 2 and/or the winding shaft 4 in a manner known to the person skilled in the art.

The protection device 1 moreover has a guide tape or guide element 5 (FIG. 2) which is disposed on a lateral peripheral region of the flexible planar structure 2 and is at least indirectly connected to the flexible planar structure 2. The flexible planar structure 2 by means of the at least one guide tape 5 is held on at least one of the guide rails 3 in the transverse direction Y. The protection device 1 in the embodiment shown has a substantially symmetrical design such that each of the two guide rails 3 (FIG. 1) is in each case assigned one guide tape 5. A lateral guiding action on both sides on the guide rails 3, and moreover a connection of the flexible planar structure 2 to the respective guide tape 5, yet to be described in more detail, are identically designed. Reference hereunder is therefore primarily made to the connection and/or guiding action in a region II, and said connection and/or guiding action in the region II (in terms of a forward travel of the motor vehicle P) is illustrated on the right side of the vehicle in FIG. 1. The same preferably applies in an analogous manner to the connection and/or guiding action on the left peripheral region of the flexible planar structure 2.

Figure 2:
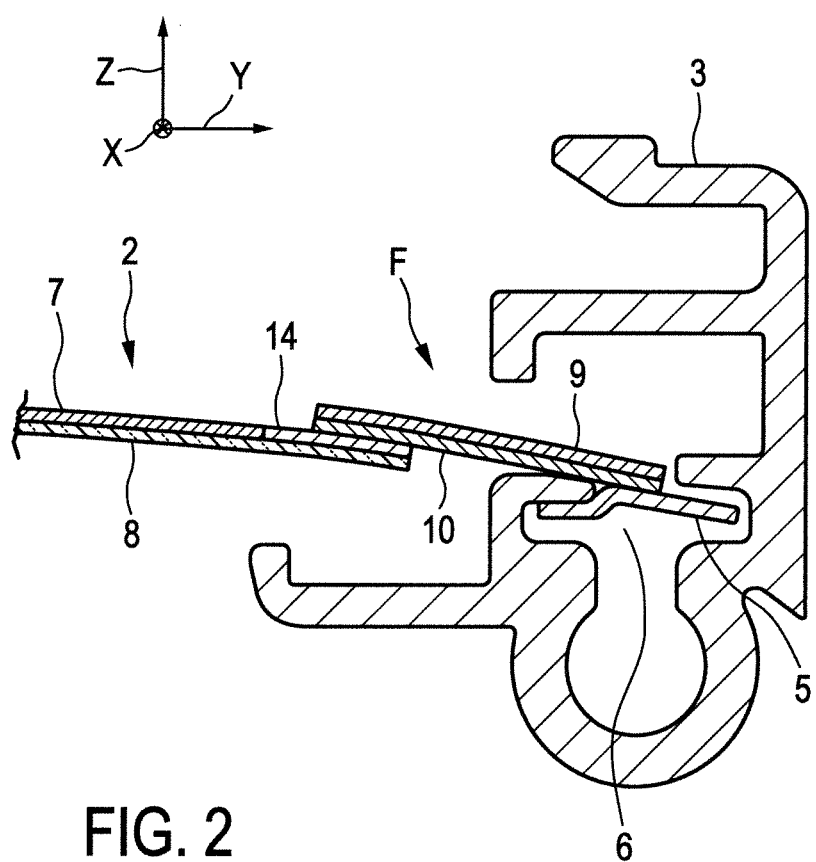
FIG. 2 shows an enlarged and schematically simplified sectional illustration of the protection device as per FIG. 1 along a section line I-I, and in a region II as per FIG. 1 in which a functional assembly of the protection device is disposed.

As is shown by means of FIG. 2, the guide rail 3 has a guide channel 6 in which the guide tape 5 is held in a form-fitting manner in the transverse direction Y and so as to be able to move by sliding along the extraction direction X. The guide rail 3 presently is moreover configured as an extruded profile.

As is furthermore shown by means of FIG. 2, the flexible planar structure 2 and the guide tape 5 are connected to one another by means of a functional assembly or connecting element F. The functional assembly F provides a load-bearing mechanical connection, on the one hand, and a current-conducting, electrically conductive connection between the guide tape 5 and the flexible planar structure 2, on the other hand. The electrically conductive connection serves for providing power to an electrical consumer 7 which is assigned to the flexible planar structure 2 and by means of FIGS. 1 and 2 is illustrated in a schematic, highly simplified manner.

The electrical consumer 7 in the embodiment shown is disposed on a textile support structure 8, wherein the textile support structure 8 and the electrical consumer 7 are connected to one another while configuring the flexible planar structure 2. This is to be understood to be purely exemplary. In an embodiment not shown in the drawings, the flexible planar structure per se can configure the electrical consumer and be accordingly specified.

In the embodiment shown, the electrical consumer 7 is a display installation, a heating installation and/or a loudspeaker installation.

The electrical consumer 7, conjointly with the textile support structure 8, is displaceable between the protective position and the resting position and to this extent able to be unwound from the winding shaft 4 and wound onto the latter.

The functional assembly F in the embodiment shown is at least largely, preferably completely, elongate along the extraction direction X across an overall length of the flexible planar structure 2. The functional assembly F here has a tape-shaped design such that the longitudinal extent along the extraction direction X is larger by a multiple than the transverse extent along the transverse direction Y. Moreover, a thickness along a height direction Z is comparatively thin.

The functional assembly F is elastically elongatable at least in the transverse direction Y. As a result of this elastic elongation capability in the transverse direction Y, a variation in the spacing between the two guide rails 3 along the extraction direction X can be compensated for. Such a variation in the spacing may be caused by production tolerances or by an intentional, non-parallel alignment of the guide rails 3.

The functional assembly F is able to be wound onto the winding shaft 4 and unwound from the latter conjointly with the flexible planar structure 2.

The functional assembly F can be connected to the guide tape 5 in a form-fitting, force-fitting or materially integral manner. The same applies in an analogous manner to the connection to the flexible planar structure 2 that in the transverse direction Y is configured on the other end of the functional assembly F.

Different variants of the functional assembly F according to the invention are illustrated in a schematic, highly simplified manner by means of FIGS. 3 to 20. The schematic functional assembly F, highly simplified by means of FIG. 2, here is to be understood to be a generic placeholder for said variants. A plurality of the variants according to the invention provides that the functional assembly F has a connection device 9 and a conduction device 10 which is connected to the connection device 9. The connection device 9 is specified for mechanically connecting the flexible planar structure 2 in a load-bearing manner to the guide tape 5. The conduction device 10 is specified for electrically connecting the flexible planar structure 2, more specifically the electrical consumer 7 thereof, in a current-conducting manner to the guide tape 5. The remarks pertaining to the illustration of the functional assembly F apply in an analogous manner to the connection device 9 and the conduction device 10 shown by means of FIG. 2. To this extent, the connection device 9 and the conduction device 10 therein are to be understood to be generic placeholders.

Figure 3:
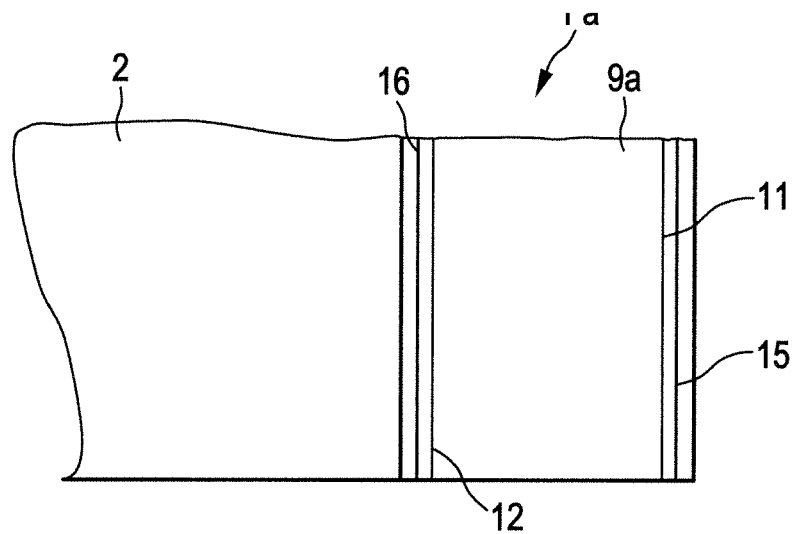
FIG. 3 shows a schematic, highly simplified, partially cutaway plan view from above onto an upper side of a first variant of the functional assembly.
Figure 4:
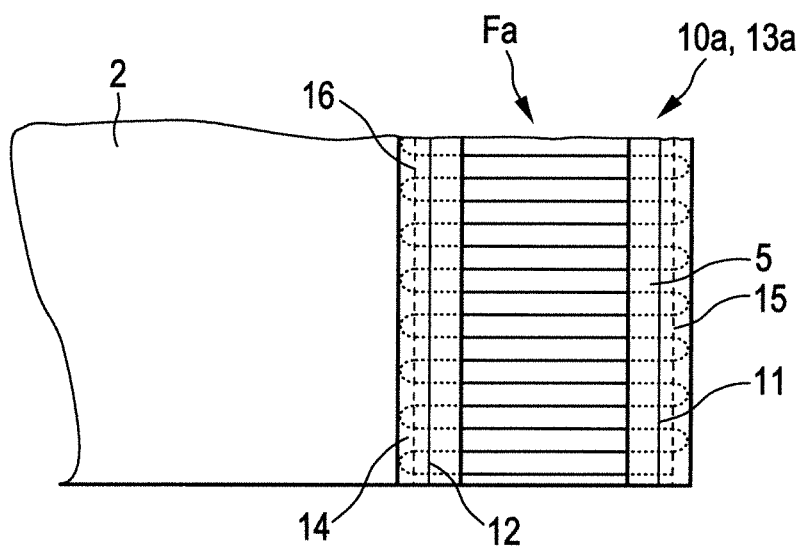
FIG. 4 shows a schematic, highly simplified, partially cutaway plan view from below onto a lower side of the variant of the functional assembly as per FIG. 3.
Figure 5:
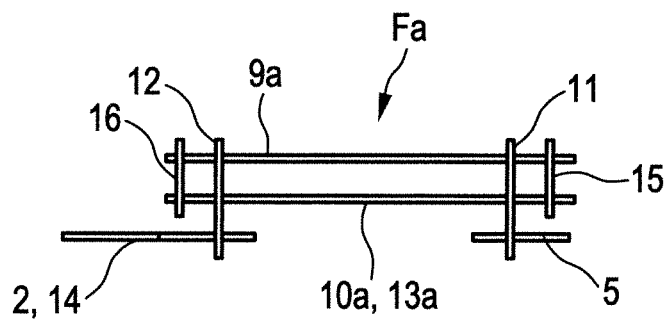
FIG. 5 shows the variant of the functional assembly as per FIGS. 3 and 4 in a schematic, highly simplified cross-sectional illustration.

In the variant as per FIGS. 3 to 5, the connection device is a textile connection tape 9a which is elastically elongatable at least in the transverse direction. The textile connection tape 9a is elongate parallel to the lateral peripheral region of the flexible planar structure 2 and/or the guide tape 5. The elastic elongation capability in the transverse direction can be caused by the material and/or by the construction of the connection tape 9a. The textile connection tape 9a in the transverse direction Y is at one end connected in a form-fitting, force-fitting and/or materially integral manner to the guide tape 5. A corresponding connection to the textile planar structure 2 is present at the other end in the transverse direction Y. In the embodiment shown, a form-fitting connection by means of two connection seams 11, 12, which may also be referred to as a first connection seam 11 and a second connection seam 12, is present. The first connection seam 11 establishes a mechanical load-bearing connection between the guide tape 5 and the textile connection tape 9a. The second connection seam 12 establishes a mechanical load-bearing connection between the flexible planar structure 2 and the textile connection tape 9a. The first connection seam 11 and the second connection seam 12 along the extraction direction X are presently elongate continuously across an entire length of the functional assembly Fa and/or of the textile connection tape 9a.

In the embodiment shown, the textile connection tape 9a forms an upper side of the functional assembly Fa that lies on the top in the height direction Z. In an embodiment not illustrated in the drawings, the textile connection tape 9a can instead be disposed on the lower side.

Furthermore, the functional assembly Fa of the variant as per FIGS. 3 to 5 has a conduction device 10a. The conduction device 10a has a thread assembly 13a. The thread assembly 13a is electrically conductive, and compliant and/or elastically elongatable at least in the transverse direction Y. The thread assembly 13a is formed by at least one thread, one yarn, one twisted yarn or the like. Moreover, the thread assembly 13a is elongate so as to meander between the guide tape 5 and the flexible planar structure 2, as well as along the extraction direction X. The thread assembly 13a covers a lower side of the textile connection tape 9a which is not referred to in more detail. In other words, the thread assembly 13a and/or the conduction device 10a form/forms a lower side of the functional assembly Fa. A width of the thread assembly 13a, which is not referred to in more detail and extends in the transverse direction Y, presently corresponds to a width of the textile connection tape 9a, which is not referred to in more detail here. The same applies in an analogous manner to a length of the thread assembly 13a that is elongate along the extraction direction X.

The thread assembly 13a by means of the first connection seam 11 is connected to the guide tape 5 and the textile connection tape 9a, on the one hand. On the other hand, the thread assembly 13a by means of the second connection seam 12 is connected to the textile connection tape 9a and the flexible planar structure 2. This is shown in particular by means of the schematic, highly simplified cross-sectional illustration as per FIG. 5 which may also be referred to as a seam diagram.

The functional assembly Fa, on the internal periphery thereof that faces the flexible planar structure 2, electrically contacts a contact tape 14 (FIG. 2). The contact tape 14 is assigned to an upper side of the flexible planar structure 2. The contact tape 14 presently is a silver contact which is disposed on the upper side of the flexible planar structure 2 and is fixedly connected to the latter. The contact tape 14 is designed so as to be flexible, and conjointly with the flexible planar structure 2, is displaceable between the protective position and the resting position.

The thread assembly 13a is electrically conductive and simultaneously elastically elongatable. To this end, the thread assembly 13a may have an elastically elongatable support thread, for example, which is not shown in more detail and is helically wrapped by an electrically conductive conduction thread.

Furthermore, a first electrically conductive connection seam 15 and a second electrically conductive connection seam 16 are presently provided. The first and the second electrically conductive connection seams 15, 16 are to be understood to be purely optional. Said connection seams 15, 16 are accordingly not present in embodiments not illustrated in the drawings. As is shown in particular by means of FIG. 5, the first and the second electrically conductive connection seam 15, 16 provide in each case an (additional) electrically conductive connection between the textile connection tape 9a and the conduction device 10a, more specifically the thread assembly 13a.

The thread assembly 13a is sewn to the connection device 9, more specifically the textile connection tape 9a, by means of the first connection seam 11, the second connection seam 12, the first electrically conductive connection seam 15 and/or the second electrically conductive connection seam 16. Alternatively or additionally to such a seam connection, in embodiments not illustrated in the drawings, the thread assembly can be connected to the textile connection tape 9a by weaving, flat or circular knitting, warp/weft-knitting or felting.

The further variants Fb to Ff of the functional assembly F shown by means of FIGS. 6 to 20 are in each case largely identical to the functional assembly Fa as per FIGS. 3 to 5. For the avoidance of repetitions, only the substantial differences of the individual variants in comparison to the functional assembly Fa and/or further variants will therefore be discussed hereunder. Functionally identical components and/or portions are provided with identical reference signs and are not separately discussed in each variant.

The functional assembly Fb differs from the functional assembly Fb substantially in that the conduction device 10b is embodied by a thread assembly 13b having a thread reserve R. The thread reserve R is formed by a plurality of "loose" thread loops S of the thread assembly 13b. "Loose" in this context means that the respective thread loops S are able to move in the transverse direction Y. This mobility is presently guaranteed in that the thread assembly 13b in the region of the thread loops S is not sewn by means of the connection seams 11, 12 and/or the electrically conductive connection seams 15, 16. In the variant as per FIGS. 6 to 8, the thread loops S are oriented transversely, in particular orthogonally, to the extraction direction X. The thread assembly 13b in the transverse direction Y has said thread reserve R on both sides such that reference may also be made to an internal and external thread reserve R.

Moreover, the thread assembly 13b in accordance with the thread assembly 13a extends so as to meander between the guide tape 5 and the flexible planar structure 2. One thread loop of the thread assembly 13b that is sewn to the guide tape 5 here is in each case followed by two loose thread loops S. The same applies in an analogous manner when proceeding from a thread loop that is sewn to the flexible planar structure 2, or the contact tape 14, respectively.

Figure 6:
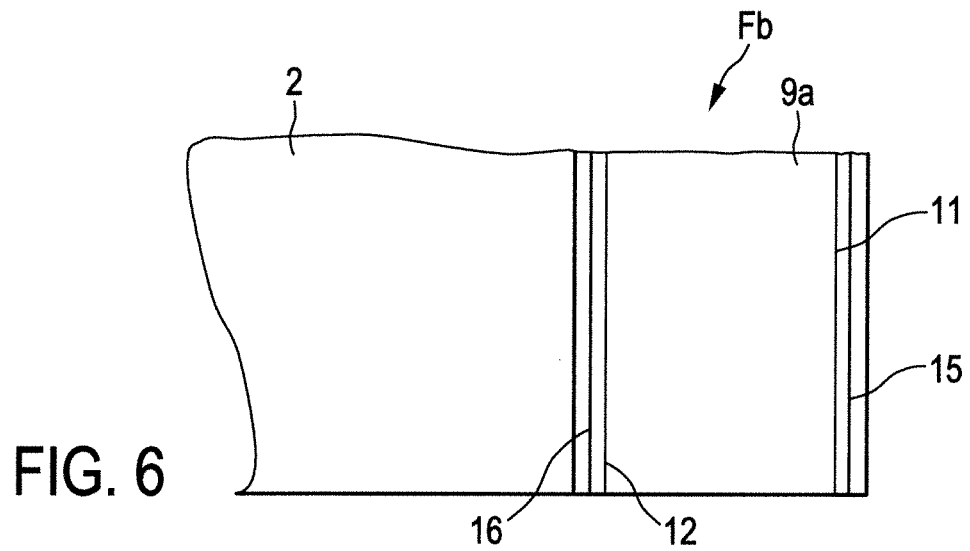
FIGS. 6, 7, 8 show a further variant of the functional assembly in a type of illustration corresponding to that of FIGS. 3, 4 and 5.
Figure 7:
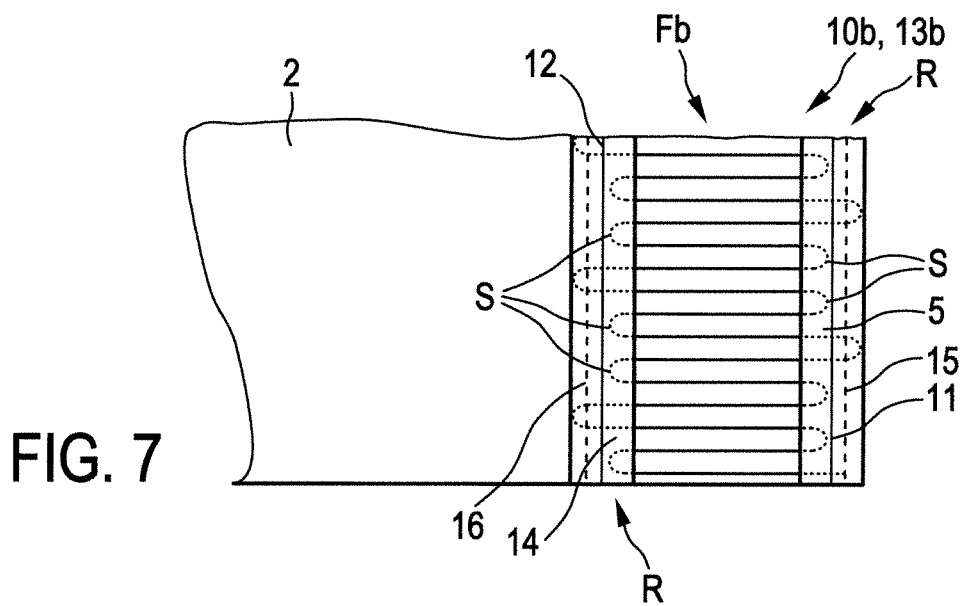
Figure 8:
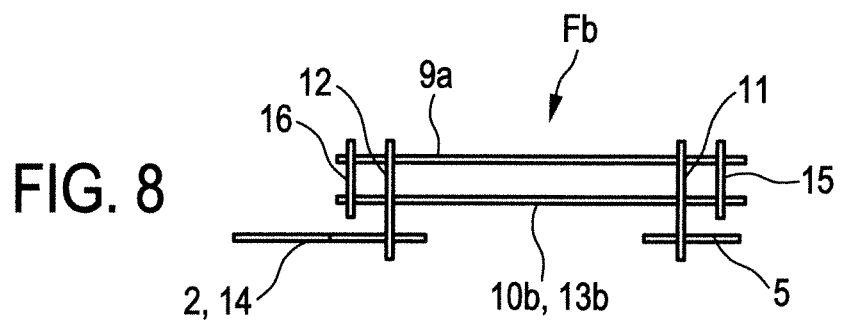
Figure 9:
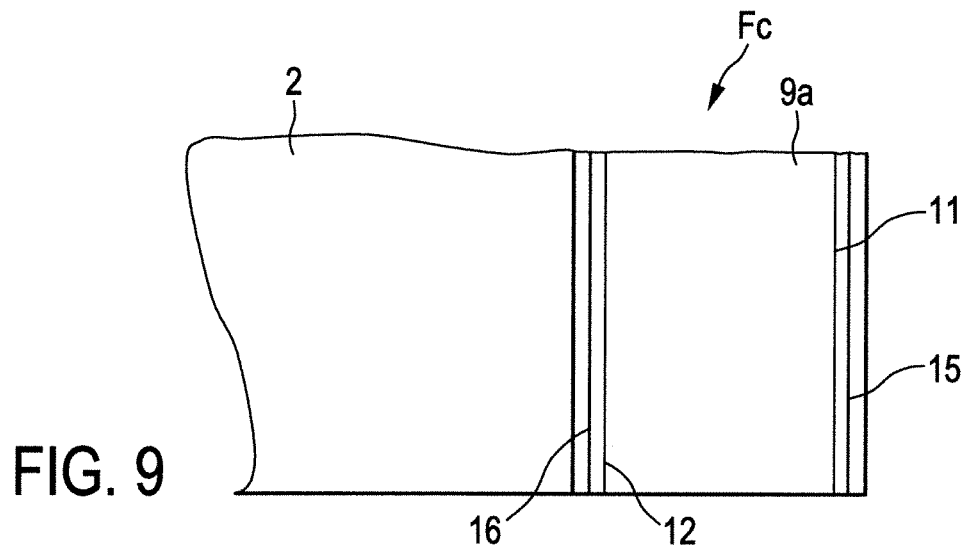
FIGS. 9, 10, 11 show a further variant of the functional assembly.
Figure 10:
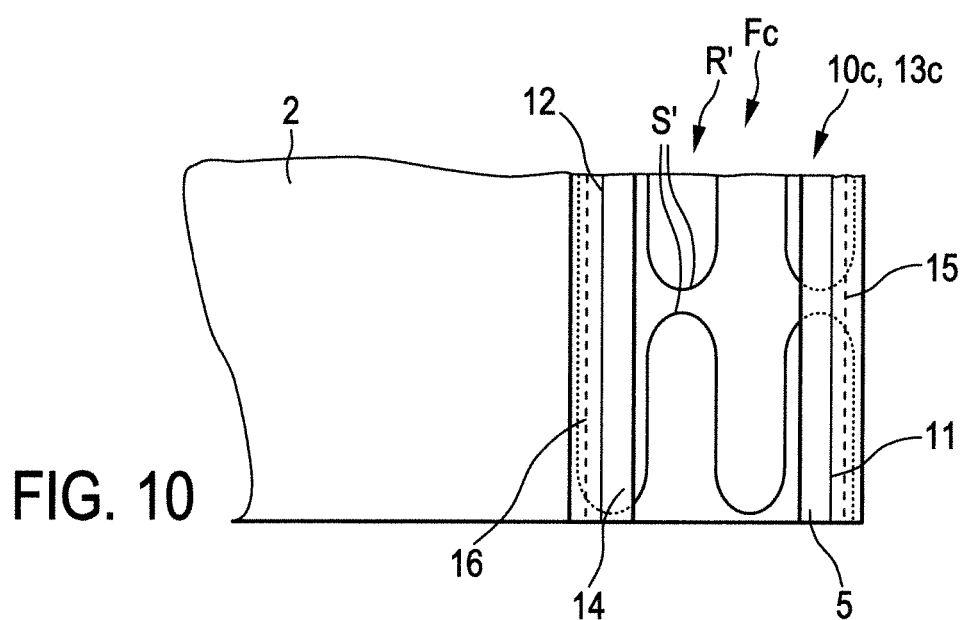
Figure 11:
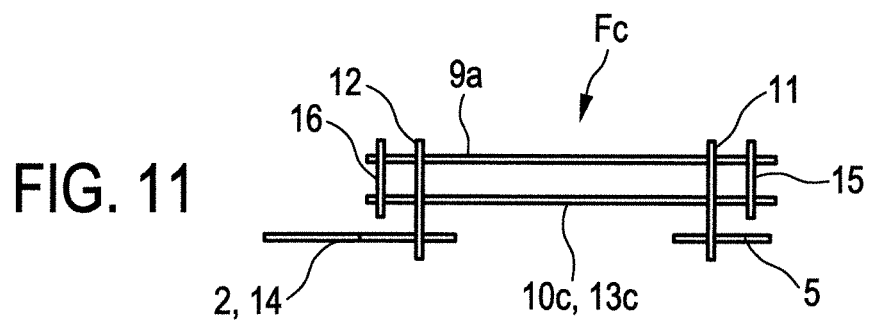
Figure 12:
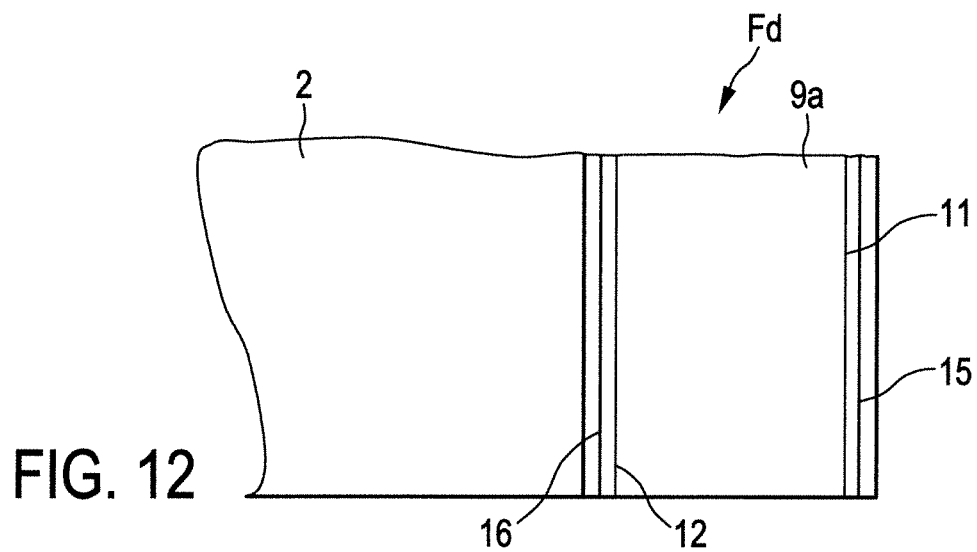
FIGS. 12, 13, 14 show a further variant of the functional assembly.
Figure 13:
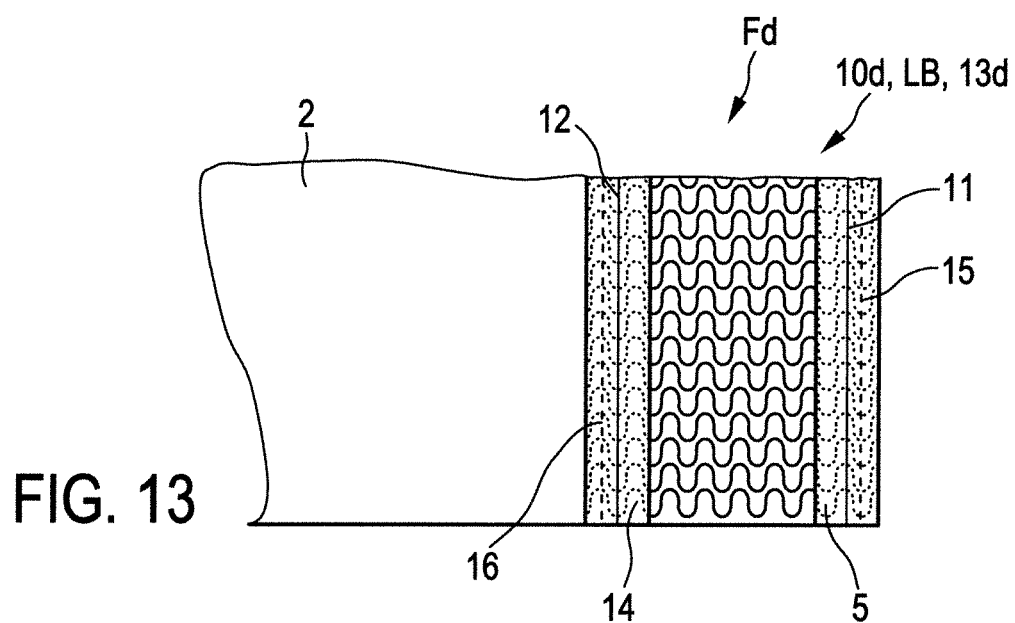
Figure 14:
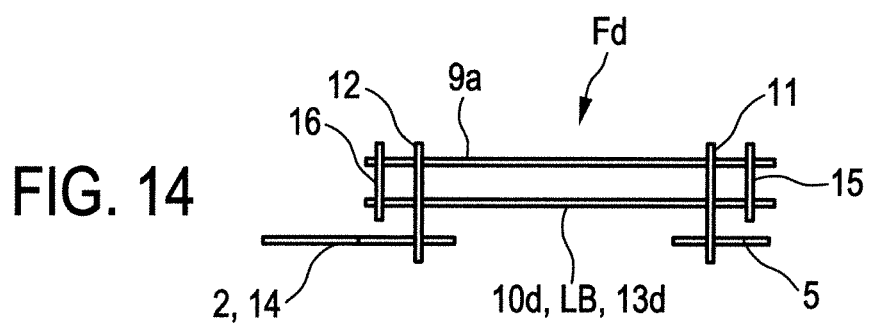

The variant as per FIGS. 9 to 11 has a functional assembly Fc which differs from the variant as per FIGS. 6 to 8 substantially by a thread reserve R' of a different design. The thread reserve R' is formed by thread loops S' which are oriented so as to be parallel to the extraction direction X.

The functional assembly Fd as per FIGS. 12 to 14 again has a textile connection tape 9a as the connection device. Moreover, a thread assembly 13d is again provided as the conduction device 10d. As opposed to the functional assemblies Fa, Fb and Fc, the thread assembly 13d is configured as a conductor tape LB. The conductor tape LB forms a lower side of the functional assembly Fd that is not referred to in more detail. The conductor tape LB is preferably configured as a woven fabric, a warp/weft-knitted fabric, a flat or circular knitted fabric or the like in the shape of a tape. The conductor tape LB is elastically elongatable in the transverse direction Y. This is presently guaranteed by a corresponding woven-fabric and/or knitted-fabric construction. The textile conductor tape LB is sewn to the textile connection tape 9a by means of the connection seams 11, 12 and/or the electrically conductive connection seams 15, 16. The connection seams 11, 12 simultaneously establish a connection between the conductor tape LB and the guide tape 5, on the one hand, and the flexible planar structure 2, on the other hand.

Figure 15:
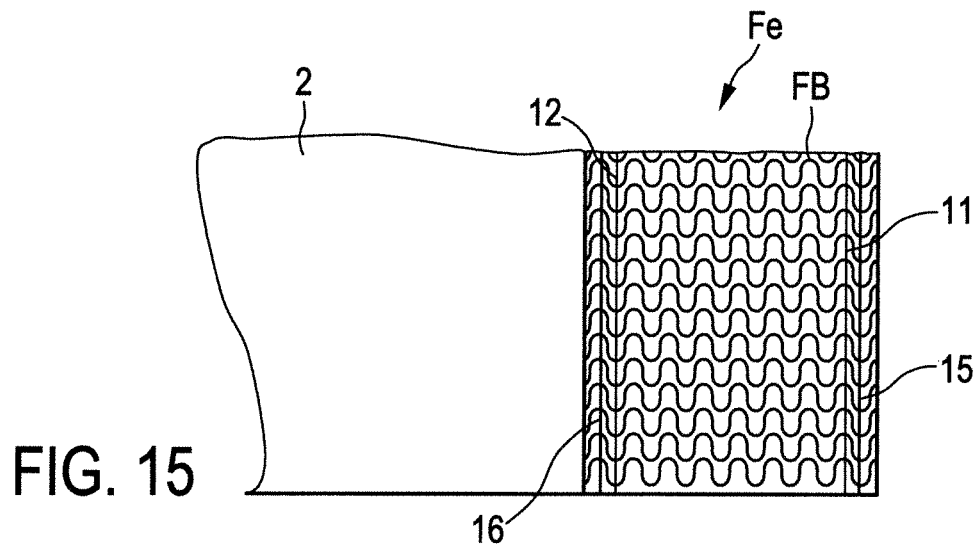
FIGS. 15, 16, 17 show a further variant of the functional assembly.
Figure 16:
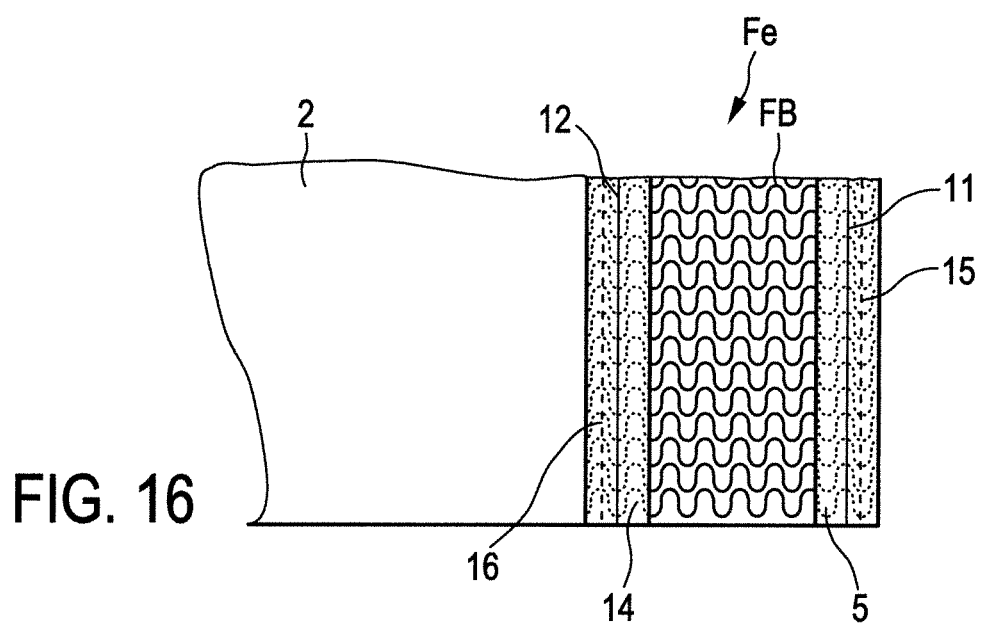
Figure 17:
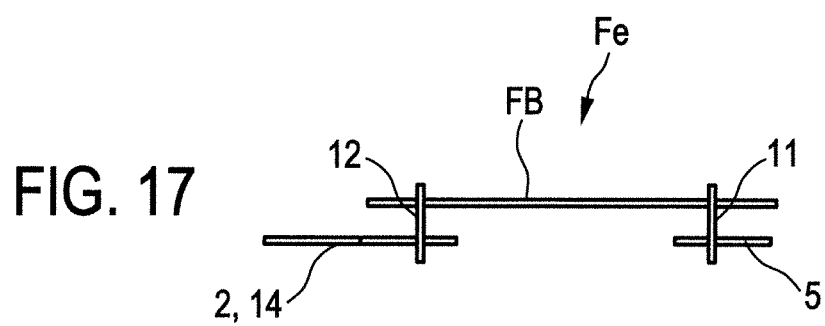

Provided in the variant as per FIGS. 15 to 17 is a functional assembly Fe which as opposed to the functional assemblies Fa, Fb, Fc and Fd, in simple words, does not have any functional separation in terms of the mechanical connection, on the one hand, and the electrical connection, on the other hand. Instead, the functional assembly Fe is a textile functional tape FB which is mechanically configured so as to be load-bearing as well as electrically configured so as to be conductive. As is shown in particular by means of FIG. 17, the present variant, as opposed to the variants discussed by means of FIGS. 3 to 14, has a single-layer construction. In terms of FIGS. 5, 8, 11 as well as 14, reference may instead be made to a dual-layer construction in which a first layer is formed by the respective conduction device or thread assembly, respectively, and a second layer, lying thereabove in the height direction Z, is formed by the connection device.

The textile functional tape FB by means of a first and a second connection seam 11, 12 is again sewn to the guide tape 5, on the one hand, and to the flexible planar structure 2, on the other hand. Electrically conductive connection seams 15, 16, such as is shown by means of FIGS. 15 and 16, can again be additionally present. The electrically conductive connection seams 15, 16 are not indicated in FIG. 17.

Shown by means of FIGS. 18 to 20 is a functional assembly Ff in which the connection device is coated with an electrically conductive coating B that serves as the conduction device 10f. The coating B is applied to a lower side of the connection device. The connection device is again designed as a textile connection tape 9f and differs from the textile connection tape 9a of the preceding variants only by way of the coating B present on the lower side. The coating B in the embodiment shown is imprinted on the textile connection tape 9f. Suitable printing methods to this end are in any case known per se, at least in the field of printing technology. The coating B is schematically symbolized by means of the longitudinal lines apparent in FIG. 19, and irrespective of the latter establishes an electrically conductive connection in the transverse direction Y between the guide tape 5 and the flexible planar structure 2. A first connection seam 11 and a second connection seam 12 are again present in order for the functional assembly Ff to be connected. The electrically conductive connection seams 15, 16 shown in dotted lines in FIGS. 18 and 19 may optionally be present.

Moreover, it is common to all of the functional assemblies F, Fa to Ff that said functional assemblies F, Fa to Ff are displaceable between the protective position and the resting position conjointly with the flexible planar structure 2. With a view to the present embodiment having the winding shaft 4 (FIG. 1), this means that the functional assemblies F, Fa to Ff are able to be wound onto the winding shaft 4 and unwound from the latter in a space-saving manner.

The invention claimed is:

1. A protection device for a motor vehicle interior comprising:
   a pair of guide rails disposed opposite one another, each side guide rail having opposite and spaced-apart walls defining a guide channel therebetween;
   a flexible planar structure having a lateral peripheral region, said flexible planar structure being displaceable along and relative to said guide rails along an extraction direction from a compact resting position to a deployed protective position, said guide rails being spaced-apart from one another in a direction transverse to the extraction direction;
   at least one guide tape extending along said lateral peripheral region of said flexible planar structure and slidably engaged within said guide channel of one of said guide rails, said walls of said one guide rail being configured to confine said at least one guide tape within said guide channel of said one guide rail in directions transverse to the extraction direction, said at least one guide tape being electrically conductive; and
   a functional assembly disposed outside of said guide channel of said one guide rail and mechanically interconnecting said lateral peripheral region of said flexible planar structure and said at least one guide tape to one another in an electrically conductive manner via an electrical connection, said functional assembly being elastically elongatable at least transversely to the extraction direction, said electrical connection supplying electrical power to an electrical consumer associated with said flexible planar structure, said functional assembly comprising an elongated component including a conduction device forming said electrical connection and a connection device connected to said conduction device and forming a mechanical connection between said lateral peripheral region of said flexible planar structure and said at least one guide tape, said connection device comprising a textile connection tape, each of said connection device and said conduction device being elastically elongatable at least transversely to the extraction direction.

2. The protection device according to claim 1, wherein said functional assembly is a separate component from each of said flexible planar structure and said at least one guide tape.

3. The protection device according to claim 1, wherein said elongated component of said functional assembly has a length oriented along the extraction direction, said lateral peripheral region of said flexible planar structure and said at least one guide tape each have a length oriented along the extraction direction, the length of said elongated component being substantially equal to one or each of the lengths of said lateral peripheral region and said at least one guide tape.

4. The protection device according to claim 1, wherein said conduction device comprises an electrically conductive thread assembly, said thread assembly being elastically elongatable at least transversely to the extraction direction.

5. The protection device according to claim 4, wherein said thread assembly is connected to said connection device by sewing, weaving, warp/weft-knitting, flat or circular knitting and/or felting.

6. The protection device according to claim 4, wherein said thread assembly comprises a thread reserve comprising a plurality of thread loops oriented in one or both of transversely to the extraction direction and/or substantially parallel to the extraction direction, at least some of said loops of said thread reserve being loosely connected to said connection device such that said thread loops are movable relative to said connection device.

7. The protection device according to claim 4, wherein said thread assembly comprises a textile conductor tape elastically elongatable at least transversely to the extraction direction.

8. The protection device according to claim 1, wherein said conduction device comprises an electrically conductive coating disposed on said connection device.

9. The protection device according to claim 8, wherein said conductive coating is imprinted on said connection device.

10. The protection device according to claim 1, wherein said elongated component of said functional assembly is connected along one side thereof to said lateral peripheral region of said flexible planar structure by a first connection seam and connected along an opposite side to said at least one guide tape by a second connection seam.

11. The protective device according to claim 10, wherein one or both of said first connection seam and said second connection seam is electrically conductive.

12. The protection device according to claim 1, further comprising an electrical consumer disposed on said flexible planar structure, said electrical consumer being configured for displacement along the extraction direction with said flexible planar structure between the compact resting position and the deployed protective position.

13. The protective device according to claim 1, wherein said guide channel of said one guide rail is a first channel portion and said one guide rail includes a second channel portion in communication with said first channel portion, said at least one guide tape being slidably engaged within said first channel portion and said lateral peripheral region of said flexible planar structure is disposed outside of, and is spaced from, said first channel portion.

14. A protection device for a motor vehicle interior, said protection device comprising:
a pair of guide rails disposed in opposed relation with one another, each of said guide rails defining therein an elongate guide channel;
a winding shaft oriented transversely to and extending between said guide rails;
a flexible planar structure fixed to said winding shaft and ported on said guide rails for movement a movement direction between a deployed protective position and a compact resting position, said flexible planar structure being unwindable from said winding shaft into the deployed protective position and windable around said winding shaft into the compact resting position, said flexible planar structure having a pair of edge regions spaced-apart from one another in a direction transverse to the movement direction and said guide rails are spaced-apart from one another in a direction transverse to the movement direction;
a pair of guide elements slidably engaged within the respective guide channels of said guide rails, each said guide element being operatively connected to one of said edge regions of said flexible planar structures; and
a connecting element interposed between one of said guide elements and the corresponding said one edge region of said flexible planar structure, said one guide element being electrically conductive, said connecting element being a separate component from said one guide element and from said flexible planar structure, said connecting element comprising a connection layer mechanically connecting said one guide element to said one edge region of said flexible planar structure in a load-bearing manner and comprising a conducting layer connected to said connection layer and electrically connecting said one guide element to said one edge region of said flexible planar structure to proved electrical power to an electrical consumer associated with said flexible planar structure, said connecting element being elastically elongatable at least in a direction transverse to the movement direction to compensate for a variation in spacing between said guide rails as said flexible planar structure is moved between the deployed protective position and the compact resting position.

15. The protection device according to claim 14, wherein said connection layer comprises an elongated and elastic tape having first and second transversely-spaced edge portions and first and second seams, said first edge portion of said elastic tape being fixed to said one edge region of said flexible planar structure by said first seam and said second edge portion of said elastic tape being fixed to said one guide element by said second seam.

16. The protection device according to claim 15, wherein said elastic tape comprises a textile tape and said conducting layer comprises an electrically conductive thread assembly fixed to said elastic tape by said first and second seams, said thread assembly comprising a plurality of thread loops disposed to meander between said one edge region of said flexible planar structure and said one guide element in directions either transverse to, or substantially parallel to, the movement direction.

17. The protection device according to claim 14, wherein said connecting element is disposed outside of said guide channel in which said one guide element is slidably disposed.

\* \* \* \* \*